United States Patent [19]

Michalski

[11] 4,330,517

[45] May 18, 1982

[54] DEFLUORINATION OF WET PROCESS PHOSPHORIC ACID

[75] Inventor: Dennis H. Michalski, Lakeland, Fla.

[73] Assignee: International Minerals & Chemical Corp., Terre Haute, Ind.

[21] Appl. No.: 248,097

[22] Filed: Mar. 27, 1981

[51] Int. Cl.³ .............................................. C01B 25/16
[52] U.S. Cl. ................................................. 423/321 R
[58] Field of Search ................. 423/321 S, 321 R, 320

[56] References Cited

U.S. PATENT DOCUMENTS

| | | | |
|---|---|---|---|
| 2,123,783 | 7/1938 | Knox | 423/321 R |
| 2,987,376 | 6/1961 | Gloss | 423/321 R |
| 3,800,029 | 3/1974 | Omoto et al. | 423/321 |
| 3,951,646 | 4/1976 | Hamada et al. | 423/244 |
| 3,983,218 | 9/1976 | Heins | 423/244 |
| 4,046,860 | 9/1977 | Kidde | 423/341 |
| 4,055,626 | 10/1977 | Drechsel et al. | 423/320 |

*Primary Examiner*—O. R. Vertiz
*Assistant Examiner*—Gregory A. Heller
*Attorney, Agent, or Firm*—H. J. Barnett

[57] ABSTRACT

An improved method of defluorinating wet process phosphoric acid using silica-containing dust which is obtained as a waste product collected from the fumes of a submerged arc furnace process of making silicon metal alloys. The silica-containing dust has a very small particle size, and contains at least about 60% by weight silica ($SiO_2$), and has a very high surface/mass ratio which increases the efficiency of the defluorination reaction.

The defluorination reaction using this silica-containing fume takes less time than required using prior methods employing diatomaceous earth as the silica source. The presence of silicon metal alloy particles in the dust are thought to have a catalytic effect on the defluorination reaction.

6 Claims, No Drawings

DEFLUORINATION OF WET PROCESS PHOSPHORIC ACID

BACKGROUND

Wet process phosphoric acid, such as that obtained from phosphate rock deposits in central Florida, contains fluorine in amounts sufficient to make it unsuitable for use in animal feed additives, human food additives, or as a raw material for the preparation of phosphate compounds used in detergent formulations. In addition, the presence of fluorine in the wet process phosphoric acid causes post precipitation of complex fluorides which hamper production of "merchant" acid grades of phosphoric acid. Environmental considerations may also require the removal of fluorine from phosphoric acid.

Various methods of defluorination have been proposed. Precipitation with salts of insoluble fluorine-containing compounds is not very useful, because substantial quantities of phosphoric anhydride are also precipitated. This represents a significant economic loss of phosphate values. Vacuum concentration has been tried, but does not remove enough fluorine to warrant the expense.

A more widely practiced process for removing fluorine from wet process phosphoric comprises the addition of silica, such as diatomaceous earth, to concentrated impure acid (54% $P_2O_5$). Diatomaceous earth (tripolite, kieselguhr) is formed from the siliceous shells of diatoms and is found in the beds of ancient seas in places such as the Great Basin of Nevada. The material is also used for filtering, as an absorbent, an insulation material, and as an abrasive in soaps. In addition to these competing uses, the cost of diatomaceous earth is increased by the transportation costs to the phosphate rock mine sites.

New government regulations have forced the construction of collectors for the fumes issuing from submerged arc furnaces used to produce ferroalloys such as ferrosilicon or other silicon alloys. The fume is collected as a dust material from the furnace exhaust gases and trapped in bag filters.

Until now, there were very few methods of disposal of the collected fume dust. It could be dumped in a land fill, discharged into sludge ponds, sold as a raw material for making refractory bricks, gunning mixes and prefabricated chimneys. Silica fume dust can also be used as a mold wash when mixed with water in some ferroalloy casting procedures, and the dust may be used as an insulation to cover molten alloys in ladles.

The above uses are not sufficient in volume to keep up with the large quantities of ferrosilicon dust which is collected. The subject invention provides a new use for this waste product, and considerably lowers the cost of defluorinating phosphoric acid.

PRIOR ART

U.S. Pat. No. 4,046,860 discloses a method of defluorinating wet process phosphoric acid which comprises the addition of about 2% by weight silica to fluorine-containing phosphoric acid (28-32% $P_2O_5$) heating under vacuum (50-180 mm Hg absolute) to a temperature of about 190° F., removing the concentrated phosphoric acid stream low in fluorine content and separately removing a vapor stream containing silicon tetrafluoride ($SiF_4$). The silicon fluoride is then scrubbed with a solution containing ammonium bifluoride or ammonium fluoride, and optionally, fluosilicic acid or ammonium fluosilicate. The aqueous solution discharged from the scrubber is neutralized with ammonia to precipitate silica and to convert all the fluorine-containing compounds to ammonium fluoride. The silica is washed and recycled.

Sodium fluosilicate can be recovered from wet process phosphoric acid by adding a sodium compound, such as caustic soda, or by adding sodium salt, to phosphoric acid not containing substantial amounts of fluosilicic acid to form a solution containing phosphoric acid and sodium dihydrogen phosphate. This aqueous solution is then added to wet process phosphoric acid containing fluosilicic acid, and the resulting sodium fluosilicate crystals are separated from the defluorinated phosphoric acid. The above process is described in U.S. Pat. No. 3,800,029.

Fluoride-free phosphoric acid is also said to be produced by the method described in U.S. Pat. No. 4,055,626. Acidulation of phosphate rock with sulfuric acid is conducted in the presence of added potassium ($KHSO_4$, $K_2SO_4$, $KH_2PO_4$ or $KOH$) and additional silica to precipitate fluorides and silica as potassium silicofluoride.

SUMMARY

This invention is directed to an improved method of defluorinating wet process phosphoric acid in which diatomaceous earth is replaced with submerged arc furnace dusts (fumes) which are obtained as waste products from submerged arc furnaces employed to make silicon alloys with other metals, such as iron and chromium. The dusts are obtained from the fumes emanating from the submerged arc furnaces and are collected in filter systems through which the fumes are passed. Since the alloying processes are conducted at high temperatures, the fumes which are generated are high in silica ($SiO_2$) content, and are generally very fine particulate materials. The dusts collected from furnaces used to make ferrosilicon alloys containing 50-75% silicon are at present the particularly preferred source of silica for defluorinating phosphoric acid because such dusts have a very small particle size, and contain at least about 60% by weight silica. These particular furnace dusts have an enormous surface/mass ratio, in excess of 25 square meters/gram. The defluorination reaction using these dusts takes less time than the reaction using diatomaceous earth, and removes a higher percentage of fluorine from the phosphoric acid in the form of silicon tetrafluoride gas. These furnace dusts are more than twice as soluble in water than diatomaceous earth, so that suspensions at comparable viscosities contain about double the concentration of active silica. Although it is not yet clearly established, it is presently thought that some ferrosilicon alloy particles remaining in the furnace dusts may have a catalytic effect on the reaction of silica and fluorine.

The improved defluorination method of this invention using these dusts collected from submerged arc furnace fumes replaces the more expensive diatomaceous earth, and eliminates the expense of its transportation. It also provides an inexpensive means to dispose of the dusts collected from submerged arc furnace fumes. Until now, these dusts have been waste products of submerged arc furnace processes for making ferrosilicon steel alloys.

DETAILED DESCRIPTION

The following examples illustrate the presently preferred embodiments of the invention.

EXAMPLE 1

Fifty pounds of 54% green phosphoric acid was used in this test. Five different silica samples were mixed well with separate charges of the phosphoric acid, and then evaporated to the target specific gravities listed below:

| Test No. | Sample | Target Sp. Gravity |
| --- | --- | --- |
| 1 | Cyprus Brand Silica | 1.75 |
| 2 | Ferrosilicon Dust | 1.85 |
| 3 | Ferrosilicon Dust | 1.75 |
| 4 | Cyprus Brand Silica | 1.85 |
| 5 | Illinois Minerals Co. Imsil A-25 | 1.85 |

The ferrosilicon dust samples employed above were collected from the fumes of a submerged arc furnace process for making 50% ferrosilicon alloy. Water was then fed to the vacuum evaporator at a rate of 15 ml/min (147 pounds/hr/ton of $P_2O_5$) under the following conditions:

| Test No. | Vacuum Inches, Hg | Temperature, °F. Acid | Temperature, °F. Steam | Specific Gravity Acid | Analysis $P_2O_5$ | Analysis F |
| --- | --- | --- | --- | --- | --- | --- |
| 1 | 26.8 | 198 | 219 | 1.765 | 53.72 | .33 |
| 2 | 26.7 | 215 | 240 | 1.833 | 56.88 | .25 |
| 3 | 26.8 | 195 | 217 | 1.760 | 53.08 | .32 |
| 4 | 27.0 | 215 | 240 | 1.837 | 57.3 | .20 |
| 5 | 26.8 | 214 | 240 | 1.834 | 57.2 | .70 |

Chemical analyses of the samples were as set forth below:

| Sample | $P_2O_5$ | CaO | MgO | $SO_3$ | $Fe_2O_3$ | $Al_2O_3$ | $Na_2O$ | $K_2O$ | F | $SiO_2$ |
| --- | --- | --- | --- | --- | --- | --- | --- | --- | --- | --- |
| Feed acid | 52.85 | .21 | .83 | 3.45 | 1.57 | 1.74 | .10 | .06 | 1.42 | .07 |
| 1 | 53.72 | .21 | .85 | 3.51 | 1.58 | 1.80 | .10 | .06 | .33 | .13 |
| 2 | 56.88 | .23 | .96 | 3.47 | 1.50 | 1.83 | .10 | .06 | .25 | .20 |
| 3 | 53.08 | .21 | .91 | 3.58 | 1.30 | 1.72 | .12 | .06 | .32 | .27 |
| 4 | 57.20 | .24 | .93 | 3.63 | 1.83 | 1.96 | .11 | .08 | .24 | |
| 5 | 56.75 | .23 | .95 | 3.85 | 1.86 | 1.98 | .12 | .08 | .70 | |

The above analyses show that the ferrosilicon dust samples of Tests Nos. 2 and 3 were just as effective as Cyprus Brand silica (Tests Nos. 1 and 4), and more effective than the Illinois Brand amorphous silica (Test No. 5) in defluorinating phosphoric acid. The fluorine content seemed to level off after four hours of steam defluorination with ferrosilicon dust. For a specific gravity of 1.75 the fluorine content was in the range of 0.30 to 0.35 and for 1.85 Target Specific Gravity, the range of fluorine content was 0.20 to 0.25. A 3-5 hour reaction time appeared to give maximum defluorination.

The phosphoric acid used in the above tests was 40% $P_2O_5$ (@53% $H_3PO_4$). Each phosphoric acid charge was analyzed for fluorine content, and the particular test silica was added to the phosphoric acid charge in an amount equal to the stoichiometric required to strip the fluorine. A sulfonate defoamer was added to Tests Nos. 2 and 3, which employed ferrosilicon dust, at a level of 5ml/50 pounds of acid.

EXAMPLE 2

A plant scale test was conducted using ferrosilicon dust collected from a submerged arc furnace making a 50% ferrosilicon alloy. It was used instead of diatomaceous earth to defluorinate phosphoric acid. Green (54% $P_2O_5$) phosphoric acid was defluorinated according to the method of Example 1 above, and satisfactory defluorination was obtained in eight hours. Equivalent size phosphoric acid batches at the same $P_2O_5$ values take about 10-12 hours to obtain the same levels of defluorination when diatomaceous earth is used for defluorination. The improved defluorination efficiency obtained using the ferrosilicon dust is attributed to a number of factors, including the following:

(1) Higher soluble silica levels in the defluorinated acid are obtained with the ferrosilicon dust (0.27% by weight ferrosilicon dust), which is more than double the soluble silica levels obtained using the diatomaceous earth form of silica described in the prior art.

(2) The ferrosilicon dust can be put into slurry suspension at much higher solids level than slurry suspensions of diatomaceous earth.

For example, a 30% solids suspension of ferrosilicon dust has a viscosity of about 48 cps (measured on a Brookfield LVF viscometer using a #1 spindle at 60 rpm). This viscosity compares to a viscosity of 150 cps (Brookfield LVF, #1 spindle at 120 rpm) for a 30% solids suspension of diatomaceous earth. At 35% solids, the ferrosilicon dust suspension has a Brookfield viscosity of 163 cps (#1 spindle at 120 rpm), while the diatomaceous earth suspension has a Brookfield viscosity of about 1300 cps (#3 spindle at 60 rpm). At 40% solids, and higher, the viscosity of diatomaceous earth suspensions were too high to measure on a Brookfield viscometer. For 40% solids and higher, the ferrosilicon dust slurries continued to increase in Brookfield viscosity as follows:

| % Solids in Slurry | Brookfield Viscosity (cps) | Spindle Number | rpm |
| --- | --- | --- | --- |
| 40 | 310 | 2 | 60 |
| 45 | 816 | 3 | 60 |
| 50 | 1182 | 3 | 60 |

A lower surface tension of the defluorinated acid resulted when ferrosilicon dust was used. Some foaming was observed, but this was readily corrected by small additions of a defoaming agent to the ferrosilicon dust containing suspension.

The ferrosilicon dust has been observed to lower the soluble iron content of the defluorinated acid. This effect was not observed when diatomaceous earth was used. For example, when the soluble iron content of the starting phosphoric acid (calculated as $Fe_2O_3$) was 1.57%, the ferrosilicon dust defluorination treatment reduced the soluble iron content to about 1.30%. The diatomaceous earth defluorination treatment left this soluble iron content unchanged.

The bulk density of the ferrosilicon dust collected from the fume of a submerged arc furnace process for making 50% ferrosilicon alloy measured at about 9.2 lbs/ft$^3$, whereas the diatomaceous earth measures at a bulk density of about 14.7 lbs/ft$^3$. In addition, it has been observed that the ferrosilicon dust stays in suspension better than the diatomaceous earth. This was observed in direct comparisons between suspensions at the same solids level. It was observed that the ferrosilicon dust suspensions are much more difficult to separate by centrifuge than the equivalent solids diatomaceous earth suspensions.

The calculated analysis of the two materials is set forth below in Table 1.

TABLE 1

| Per Cent by Weight | Dust From 50% Ferrosilicon Alloy Process | Diatomaceous Earth |
|---|---|---|
| SiO$_2$ | 75.64 | 85 |
| SiC | 3.04 | — |
| Fe$_2$O$_3$ | 11.98 | 1.5 |
| K$_2$O | 2.36 | — |
| CaO | 1.18 | .2 |
| MnO | 1.08 | — |
| MgO | .69 | .3 |
| Al$_2$O$_3$ | .59 | 4.5 |
| ZnO | 1.18 | — |
| PbO | .09 | — |
| Free Carbon | 2.17 | — |

Although the above Table 1 shows that the actual silica content of the ferrosilicon dust is only 77% compared to 85% for diatomaceous earth, the defluorination effect is not reduced, and the time required for defluorination can be unexpectedly and significantly reduced without loss of effectiveness. In addition to the ferrosilicon dust collected from the 50% ferrosilicon alloy process, other similar dusts can be used with all the same advantages as described above. Such dusts include ferrosilicon dust collected from the fumes of a submerged arc furnace process for making 75% ferrosilicon alloy (75% silica content). This latter dust has about 84% silica content and about 1-3% Fe$_2$O$_3$, and is just as effective as the ferrosilicon dust described above in defluorinating wet process phosphoric acid.

In another embodiment, dusts collected from other silicon metal alloy submerged arc furnace processes can be used to defluorinate wet process phosphoric acid. The important requirement is that the dust contain at least about 60% by weight silica (SiO$_2$), and that it have a dry bulk density less than about 11 lbs/ft$^3$. Characteristically, these dusts are capable of being made into suspensions comprising at least 20% solids, and preferably at least 30% solids and because of the effects of the silicon metal alloy submerged arc process, the dusts have very high surface/mass ratios of at least 20-30 square meters/gram.

There is a significant economic advantage obtained by using silicon metal dust waste products for defluorinating phosphoric acid instead of the more costly diatomaceous earth which is found in the beds of ancient seas in places which are sometimes remote from the phosphoric acid defluorination sites. Considerable expense is entailed to transport the diatomaceous earth to the site. In addition, the cost of mining must be added to the other handling costs.

Ferrosilicon and silicon metal alloy dusts are waste products from submerged arc processes for making silicon metal alloys. Until now, disposal of these materials presented a major problem for silicon metal alloy manufacturers. Consequently, the materials can be supplied most inexpensively to defluorinate wet process phosphoric acid, and a waste disposal problem is eliminated, because the waste material becomes part of a salable product.

Various modes of carrying out the invention are believed to be within the scope of the following claims.

I claim:

1. In a method of defluorinating phosphoric acid, in which concentrated wet process phosphoric acid is heated to boiling in the presence of silica to form water vapor and silicon tetrafluoride, the improvement comprising the step of contacting the phosphoric acid with an aqueous suspension comprising at least about 11% solids of a silica-containing dust collected as fume from silicon and silicon metal alloy furnace operations, said dust having a dry bulk density of less than about 10 lbs/ft$^3$, and a silica content of at least about 60% by weight.

2. The method of claim 1, in which the surface/mass ratio of the silica-containing dust is at least 25 square meters/gram prior to suspension in water.

3. The method of claim 1, in which the phosphoric acid being defluorinated has a P$_2$O$_5$ value of about 30-60% by weight.

4. The method of claim 3, in which the silica-containing dust is collected from ferrosilicon metal alloy furnace operations, and contains about 1-12% iron oxide and at least about 70% SiO$_2$.

5. The method of claim 4, in which the silica-containing dust has the following calculated dry analysis: SiO$_2$-75.64; SiC-3.04; Fe$_2$O$_3$-11.98; K$_2$O-2.36; CaO-1.18; MnO-1.08; MgO-0.69; Al$_2$O$_3$-0.59; ZnO-1.18; PbO-0.09; and Free Carbon-2.17.

6. The method of claim 4, in which the silica-containing dust contains about 84% SiO$_2$ and about 1-3% Fe$_2$O$_3$.

* * * * *